No. 695,974. Patented Mar. 25, 1902.
M. WALLERSTEIN & H. H. FREUND.
APPARATUS FOR MIXING WORT AND YEAST AND AERATING THEM.
(Application filed May 23, 1901.)
(No Model.)
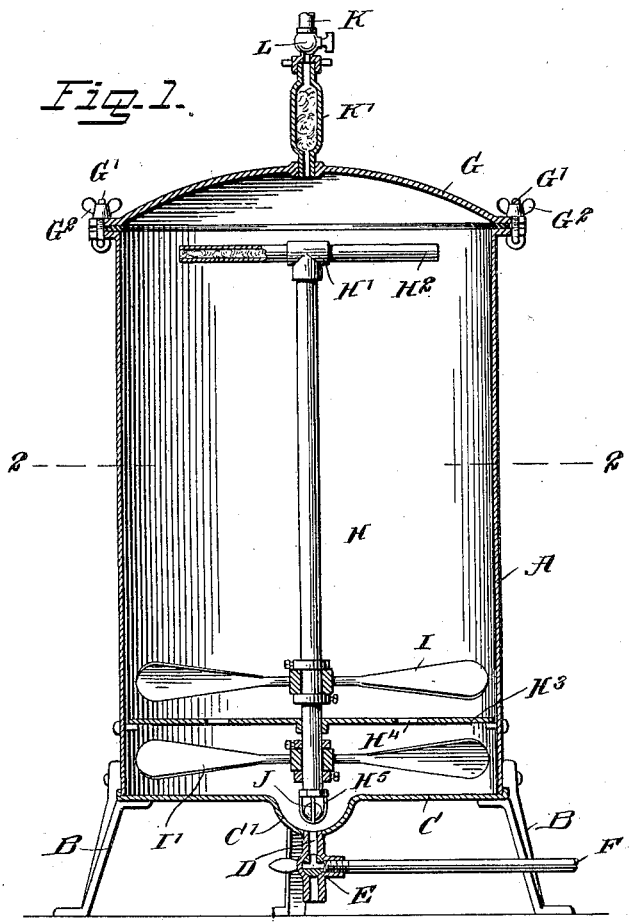
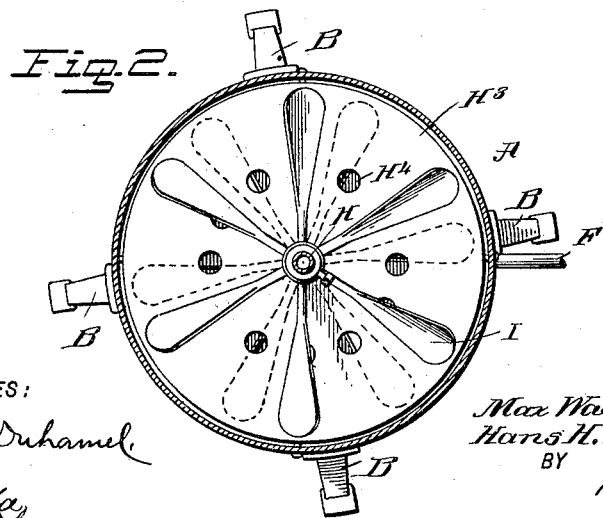
WITNESSES:
INVENTORS
Max Wallerstein
Hans H. Freund
BY
ATTORNEYS

UNITED STATES PATENT OFFICE.

MAX WALLERSTEIN AND HANS H. FREUND, OF NEW YORK, N. Y.

APPARATUS FOR MIXING WORT AND YEAST AND AERATING THEM.

SPECIFICATION forming part of Letters Patent No. 695,974, dated March 25, 1902.

Application filed May 23, 1901. Serial No. 61,535. (No model.)

*To all whom it may concern:*

Be it known that we, MAX WALLERSTEIN and HANS H. FREUND, subjects of the Emperor of Germany, and residents of the city of New York, borough of Manhattan, in the county and State of New York, have invented new and useful Improvements in Apparatus for Mixing Wort and Yeast and for Aerating Them, of which the following is a full, clear, and exact description.

Our invention relates to apparatus for mixing wort and yeast and for aerating them, and has for its object to provide a simple, efficient, and easily-operated apparatus of the above-indicated class which will thoroughly mix yeast and wort and at the same time inject pure filtered air into them.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 is a central sectional elevation of our improved apparatus, and Fig. 2 is a sectional plan taken on the line 2 2 of Fig. 1.

The apparatus comprises a shell A, supported by legs B and provided with a bottom C, having a central depression C' for a purpose stated hereinafter. At the bottom of said depression is an outlet D, controlled by a three-way cock E, which is provided with the handle shown in the lower part of Fig. 1, so that the interior of the vessel or shell may communicate either directly with the atmosphere or with a discharge-pipe F, leading to a place where the aerated mixture of wort and yeast is to be used—for instance, to a fermenting-vat. The top of the shell A is normally open, but may be closed hermetically by means of a lid G, to be fastened by means of screws G', pivotally attached to the shell and adapted to swing into notches at the edge of the lid, and nuts $G^2$, screwing on said screws.

Within the shell A is movable up and down the agitator and aerator, which consists of a central vertical tube H, with the upper end of which is connected, detachably, as by a union H', an inlet and filtering tube $H^2$, which is arranged transversely, so that it may form a handle for the convenient manipulation of the agitator. The transverse tube $H^2$ is open at its ends and is filled with sterilized cotton-batting or like material forming an air-filter. With the vertical tube H is rigidly connected a horizontal disk $H^3$, the edge of which is in sliding engagement with the shell A, and thus serves to guide the agitator in its up-and-down movement. The disk $H^3$ has a series of perforations $H^4$, so that the liquid may pass therethrough freely. Above and below the disk $H^3$ are located agitating screw-blades I I', mounted to turn on the tube H and made of opposite pitch, so that they will rotate in opposite directions at the same time. These agitating-blades move up and down with the tube H. At the bottom of the latter is located a cage $H^5$, containing a ball-valve J, adapted to close the lower end of the tube when it is moved downward, but arranged to open during the upward movement of the tube H. The depression C' of the bottom C is of a proper size to receive the valve-cage $H^5$ without its striking the bottom. When the handle $H^2$ is raised, carrying with it the tube H, the agitators I I', and the partition $H^3$, a partial vacuum is created in the lower part of the vessel A. The partition $H^3$, being unable to pass readily through the liquid, has a tendency to lift the same bodily, and this of course produces more or less suction in the bottom of the vessel, thus tending to draw air into the same. Air now enters through the handle $H^2$, passes down through the tube H, and escapes in the first part of the upstroke into the liquid in the little bowl or pocket C'. By this means the air is released at the lowest part of the vessel. The air of course scatters radially outward through the valve, and as the agitators I and I' are in motion the air not only separates into bubbles, but each bubble pursues a spiral course upward until it reaches the partition, then passing through the holes $H^4$ the bubbles are driven in spiral paths, but in the opposite direction.

The lid G is provided with an air-inlet pipe K, containing an air-filter K' and fitted with an air-cock L, controlling the connection of the vessel with a pipe (not shown) connected with a supply of compressed air.

The vessel formed by the shell A, bottom C, and lid G is preferably made of copper, tinned on the inside.

In operation, the lid G being removed, the cock E closed, and the vessel filled to a suitable height with wort and yeast, and the operator takes hold of the handle H² and moves it up and down. This agitates the liquid by the action of the plate or disk H³, said liquid passing through the perforations H⁴. Further, the agitating screw-blades I I' are caused to turn in opposite directions, and thus contribute to mix the yeast and wort. At the same time as the handle moves up air is drawn in through the handle and the vertical tube H, the valve J being open. The air is filtered as it is drawn in. When the agitator moves down, the valve J closes. The air is agitated together with the liquid and is thoroughly distributed therein. After this operation has been continued a sufficient length of time the lid G is fastened on, and upon opening the cock L filtered air is admitted to the vessel, so that when the cock E is turned to place the interior of the vessel in communication with the discharge-pipe F the wort and yeast will be driven out by air-pressure. This manner of conveying the wort and yeast saves considerable time and labor.

Having thus described our invention, we claim as new and desire to secure by Letters Patent—

1. A device of the kind described, comprising a cylindrical containing vessel, a pair of agitating members located therein and revoluble in opposite directions, and a movable disk provided with perforations and located between said agitating members.

2. A device of the kind described, comprising a cylindrical containing vessel, a disk provided with perforations and free to slide therein, a movable stem passing through said disk and rigidly secured to the same, and a pair of agitating members loosely mounted upon said stem and provided with blades of opposite pitch, said members being located one above the other below said disk, and free to rotate in opposite directions.

3. A device of the kind described, comprising a cylindrical containing vessel, a disk provided with perforations and free to slide therein, a hollow air-stem provided with a valve rigidly secured to said disk and serving as a handle for the same, a pair of agitating members loosely mounted upon said stem and provided with blades of opposite pitch, said members being located one above the other below said disk and free to rotate in opposite directions, all of said parts being free to act simultaneously.

4. A device of the kind described, comprising a cylindrical containing vessel provided at its bottom with a pocket for virtually increasing the depth of a liquid contained therein, an air-inlet extending into the lower part of said pocket for the purpose of lengthening the flow of air-bubbles escaping through said liquid, and an agitating device located in said containing vessel and in the path of said escaping air-bubbles.

5. A device of the kind described, comprising a cylindrical containing vessel provided at its bottom with a pocket, an air-inlet extending into the power part of said pocket, and agitating devices located in said containing vessel.

6. A device of the kind described, comprising a cylindrical containing vessel, an agitating device mounted to slide therein, and an annular rest secured within said containing vessel for the purpose of supporting said agitating device and of spacing the same from the bottom of said containing vessel.

7. A device of the kind described, comprising a cylindrical containing vessel, a perforated disk free to slide therein, a manually-operated tube provided with an air-inlet and extending through said disk and rigidly secured thereto, and a pair of agitating members provided with blades of opposite pitch, said members being free to move in opposite directions when said manually-operated tube is actuated.

In testimony whereof we have signed our names to this specification in the presence of two witnesses.

MAX WALLERSTEIN.
HANS H. FREUND.

Witnesses:
JOHN LOTKA,
JNO. M. RITTER.